UNITED STATES PATENT OFFICE.

ALONZO F. HOYLE, OF WORCESTER, MASSACHUSETTS.

COATING COMPOUND FOR WIRE-DRAWING.

SPECIFICATION forming part of Letters Patent No. 297,131, dated April 22, 1884.

Application filed October 19, 1883. (No specimens.)

*To all whom it may concern:*

Be it known that I, ALONZO F. HOYLE, of Worcester, in the county of Worcester, State of Massachusetts, have invented a certain new and useful Improvement in Coating Compounds for Wire, of which the following is a description, sufficiently full, clear, and exact to enable any person skilled in the art or science to which said invention appertains to make and use the same.

In the process of wire-drawing, the wire, after it comes from the rolling-mill, is usually cleaned or scaled in a bath of diluted sulphuric acid, after which it is thoroughly rinsed with pure water and then coated, preparatory to being drawn.

The coatings heretofore in most common use consist of wheat or rye flour paste, lime-paste or milk of lime, a mixture of lime, common salt, and water, and sometimes a simple solution of salt in water. The objection to the use of flour paste is that much time is required in drying it after it is applied to the wire, and great difficulty experienced in applying it evenly, causing the work of drawing the wire to be imperfectly performed, for reasons which will be readily obvious to all conversant with such matters without a more explicit description. The same objection pertains to the use of a simple solution of salt or of a solution of salt and lime, though perhaps not to as great an extent. An additional objection, however, exists in connection with the use of salt, as it has a tendency to rapidly oxidize the wire, and thereby injure it.

My invention is designed to obviate all of these objections and difficulties; and to that end I discard both flour paste and salt, and make use of the following compound, which I have found to be very efficacious as a coating for the wire when used in connection with oil or any of the ordinary lubricants employed in wire-drawing, viz:

Formula: Take one hundred gallons of lime-water and one hundred and twenty-five pounds of common brown sugar. Dissolve the sugar in the lime-water and thoroughly incorporate the ingredients by stirring, or in any other convenient manner.

In the use of my improvement, the wire, after leaving the rolling-mill, is scaled or cleaned in a vitriol bath and rinsed in water, after which it is placed in a vat or tub containing a sufficient quantity of the above solution or compound to properly cover it, the solution being boiled by means of steam-pipes arranged in the vat. After the wire has remained immersed until it acquires the temperature of the boiling compound, and is properly coated, or, say, from twenty minutes to an hour, it is removed and placed in a dry-house, where the coating is thoroughly dried on, after which the wire is oiled or lubricated and drawn in the usual manner.

Instead of the sugar, ten or twelve gallons of molasses may be used to each one hundred gallons of the lime-water, and produce substantially the same results.

I do not confine myself strictly to the proportions given, as these may be varied considerably, if desired, without materially changing the nature of the compound.

Other equivalent alkaline substances may also be used in place of the lime, if preferred, without departing from the spirit of my improvement.

Having thus explained my invention, what I claim is—

1. The improved coating for wire herein described, the same consisting of lime-water and sugar, compounded substantially as and in the proportions set forth.

2. In a compound for coating wire preparatory to drawing the same, the combination of lime and sugar, substantially as specified.

ALONZO F. HOYLE.

Witnesses:
EDWIN C. HIGGIN,
CHAS. F. RUGG.